Figure 1:
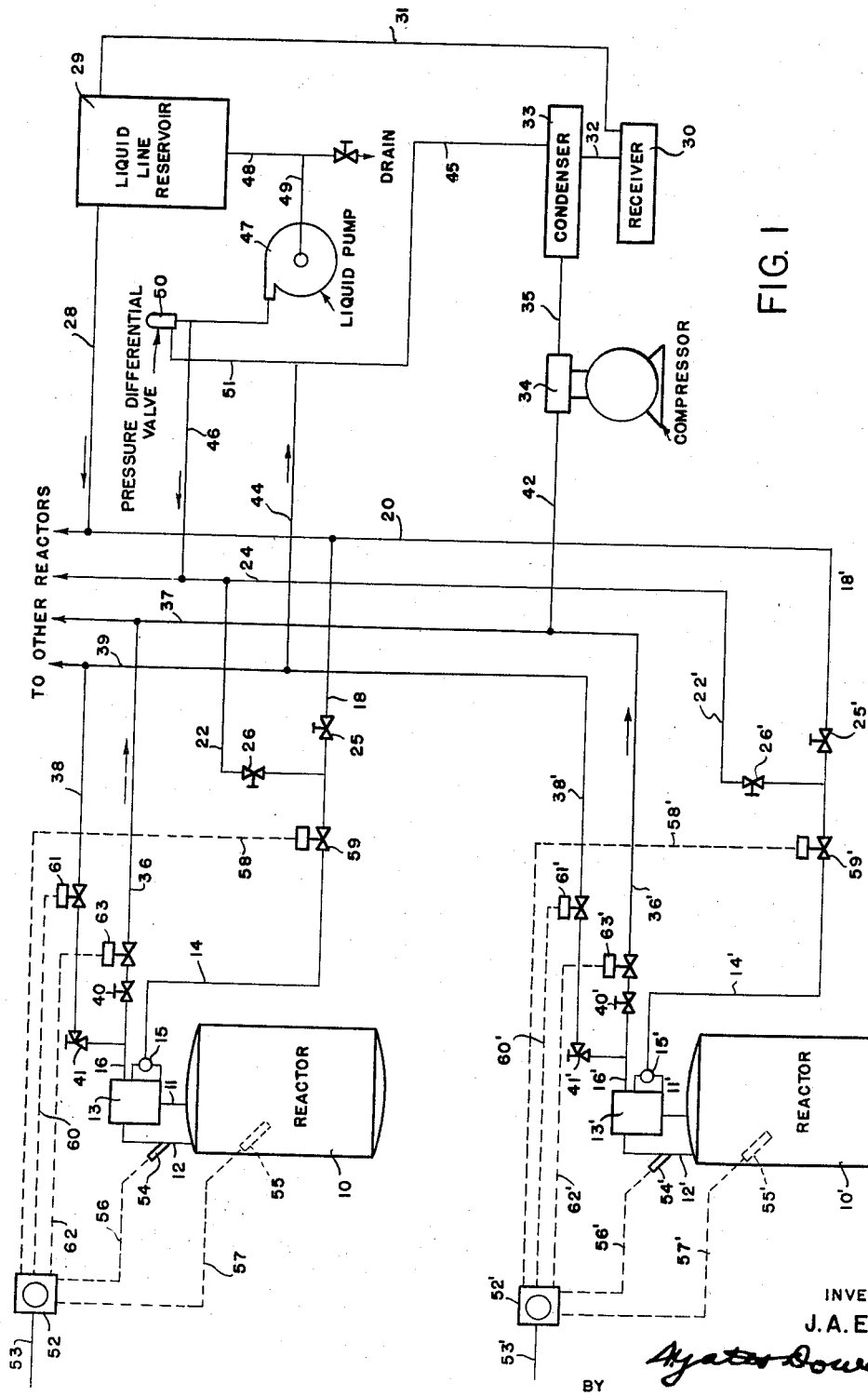

May 24, 1960

J. A. ETTER 2,937,512

CONTROL OF APPARATUS OPERATING AT HIGH AND LOW TEMPERATURES

Filed April 17, 1956

2 Sheets-Sheet 1

INVENTOR
J. A. ETTER

BY

ATTORNEY

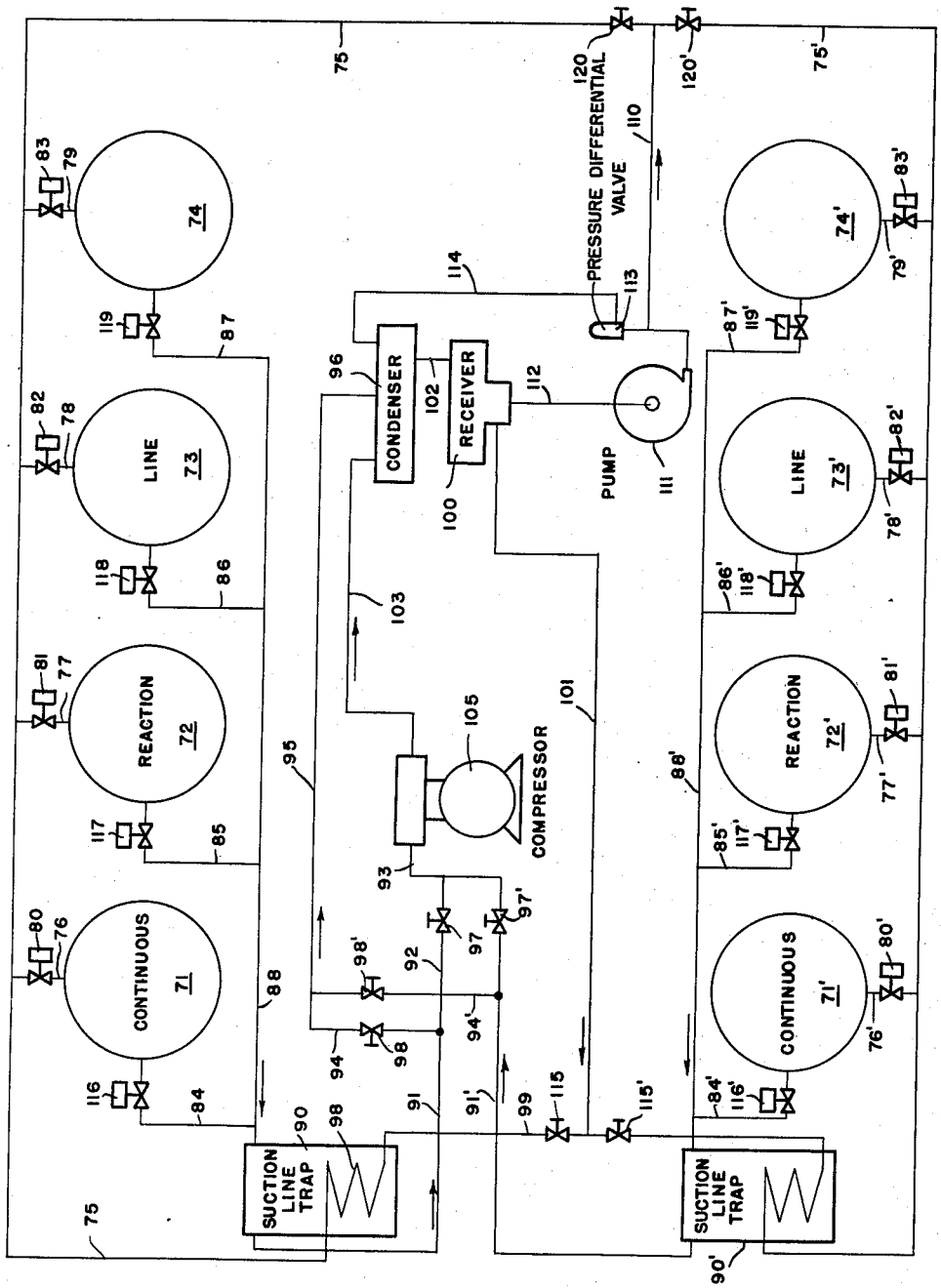
May 24, 1960     J. A. ETTER     2,937,512
CONTROL OF APPARATUS OPERATING AT HIGH AND LOW TEMPERATURES
Filed April 17, 1956     2 Sheets-Sheet 2
INVENTOR
J. A. ETTER
ATTORNEY

United States Patent Office 2,937,512
Patented May 24, 1960

2,937,512

CONTROL OF APPARATUS OPERATING AT HIGH AND LOW TEMPERATURES

Joseph A. Etter, Cincinnati, Ohio, assignor, by mesne assignments, to Frick Company, Waynesboro, Pa., a corporation of Pennsylvania Filed Apr. 17, 1956, Ser. No. 578,731

13 Claims. (Cl. 62—196)

This invention relates to refrigeration and more particularly to the control of temperature in chemical processes, such control being necessary not only to retard but to govern the speed and quality of reaction in order to obtain uniformity and high uniform quality of the end product by preventing undesired or improper reaction.

This application is a continuation in part of my Patent 2,764,476, entitled Reaction Tank and Thermo-Regulator System.

The present invention relates to the same field of endeavor as my earlier application and contemplates the use of coil structure which may be like that in the earlier application although the present invention is not limited thereto.

The problem of controlling certain chemical processes which are exothermic, such as in the production of synthetic rubber, has limited the production obtainable from the equipment used. In my earlier application, to which reference has been made, a cooling coil design is disclosed with a refrigeration system for utilizing it. The refrigeration system of that application is adapted for the control of reaction temperatures below the normal condensing temperature of the refrigeration system.

In connection with problems in the synthetic rubber industry, however, it is oftentimes necessary to control reaction temperatures which may either be above or below the condensing temperature of the system, and may vary as to a particular reactor or as to a group. Accordingly, it is desirable in the operation of one or a number that the system have sufficient flexibility that any one or more of the reactors may be efficiently operated at temperatures either above or below the condensing temperature and that changeover from one type of operation may be quickly and easily made to the other.

Accordingly it is an object of the present invention to provide an apparatus and process for effecting and controling chemical reactions in manufacturing processes and in a manner to overcome the problems described above.

Another object of the invention is to provide a system capable of producing and maintaining suitable and uniform temperatures in one or more reactors, regardless of whether or not the reactor is operating at a temperature above or below the temperature of the condenser.

A further object is the provision of refrigeration apparatus adapted for controlling the temperature in one or more reactors operating either as batch reactors or in a continuous flow line.

Further objects and advantages of the invention will be apparent from the following description taken in conjunction with the accompanying drawings wherein:

Fig. 1 is a diagrammatic view illustrating the application of the present invention to a batch type reactor system, and Fig. 2, a diagrammatic view illustrating the application of the present invention to a continuous reaction line type system.

Briefly stated, the illustrated embodiment of the present invention comprises a plurality of reactors and associated equipment, each reactor having evaporator coils in heat exchange relation which are supplied with refrigerant, the supply being connectable to a compressor-condenser-receiver for reactor operation whose temperature is below the condensing temperature or alternately to a pump operating independently of the compressor for circulating refrigerant to the coils and forcing it back into the condenser which operates at a lower temperature or at the same temperature.

With further reference to the drawings, and particularly Fig. 1, a pair of batch type reactors 10 and 10' is illustrated (corresponding elements associated with reactor 10' having a corresponding numeral with a prime). The reactors are similar in type and hookup and the detailed description will refer to reactor 10. Reactor 10 has evaporator coils therein which may be of the type disclosed in my Patent 2,764,476, connected by a liquid refrigerant supply line 11 and return line 12 to an accumulator or surge drum 13 which is supplied with refrigerant from a line 14, the level in the accumulator being maintained by a float control valve 15. From the accumulator, gaseous refrigerant is withdrawn through line 16.

The liquid supply line 14 may receive refrigerant either from line 18 and header 20 or from line 22 and header 24, depending upon the setting of the valves 25 and 26 in the lines 18 and 22, respectively. Header 20, which may supply refrigerant to any of the reactors, is connected by line 28 to liquid line reservoir 29 which receives refrigerant from receiver 30 through line 31, the receiver being connected by line 32 to condenser 33 which receives compressed refrigerant from compressor 34 through line 35.

The return line 16 from the accumulator 13 may be connected alternately to the line 36 and header 37 or to the line 38 and header 39, depending on the setting of the valves 40 and 41 in the lines 36 and 38, respectively. Header 37 is connected to the suction line 42 to the compressor and header 39 is connected to line 44 which returns the refrigerant to the condenser through line 45.

The liquid supply header 24 previously mentioned is connected to the discharge line 46 of liquid pump 47 which receives liquid refrigerant from reservoir 29 through the lines 48 and 49. The liquid pump is connected below the reservoir 29 in this illustration to provide for a constant liquid head to the pump. In the event that the back pressure to the pump exceeds a certain predetermined value as a result of the operation of the automatically controlled valves (presently to be described) in the evaporator supply lines, a pressure differential valve 50 will permit the refrigerant to be pumped through lines 51 and 45 directly back to the condenser.

Although various ways for automatically controlling the temperature within the reactors may be employed, there is illustrated a controller 52 which is supplied with a source of energy such as compressed air or electricity through line 53. The controller has temperature or pressure responsive devices 54 and 55 connected thereto by lines 56 and 57, respectively, which devices are sensitive to the temperature or pressure in the line 12 to the accumulator and within the reactor. From the controller a control line 58 is connected to an automatic valve 59 in the supply line 14, a line 60 to an automatic valve 61 in the return line 38, and a line 62 to an automatic valve 63 in the return line 36.

It will be understood that the reactor 10' and any others that may be used may be connected in similar manner and using similar controls so that any number may be connected for operation from the system. Also, although only one compressor is shown, the system is not limited to the number or type of compressors or condensers.

In the operation of the system, assuming that reactor 10 is operated at a particular time at temperatures below the condensing temperature, the supply line 14 is connected to the refrigerant header 20 by line 18 for receiving refrigerant from the reservoir 29 through lines 28 and 31, valve 25 being open and valve 26 closed. From the accumulator the return line 16 is connected to the return header 37 by line 36, valve 40 being open and valve 41 closed, the header being connected by suction line 42 to the compressor.

Assuming that at the same moment reactor 10′ is operated at temperatures above the condensing temperature, the supply line 14′ is connected by line 22′ to header 24 for receiving liquid refrigerant from the pump 47 through line 46. Refrigerant from the accumulator 13′ is discharged through the line 16′ into the return line 38′ to the header 39. From the header 39 the refrigerant returns to the condenser 33 through lines 44 and 45.

By merely changing the setting of the valves in the supply and return lines 14 and 16, or 14′ and 16′, etc., it will be understood that any of the reactors may be quickly and simply changed from operation above or below the condensing temperature to operation below or above the same.

Various control means may also be employed to operate the compressor and the liquid pump, it being understood that operation of the compressor is unnecessary in the event that all of the reactors are operating at temperatures above the condensing temperature and that operation of the liquid pump is unnecessary in the event that all of the reactors are operating at temperatures below the condensing temperature.

A somewhat modified arrangement is illustrated in Fig. 2, to which reference will now be made.

In Fig. 2, a pair of lines of vats 71, 72, 73, 74 and 71′, 72′, 73′, 74′ are shown, although fewer or additional lines may be used if desired. Each line represents a continuous reaction line flow in which material enters into the first reactor and then overflows into the second and continues on through the series of reactors until the reaction has been completed.

The reactors are supplied with refrigerant from a header 75 through their individual lines 76, 77, 78, 79, the flow through which is controlled by valves 80–83, which may be automatically controlled by means such as that illustrated in connection with Fig. 1. Conventional float controls and an accumulator may be used with each reactor as described in connection with Fig. 1.

The return lines 84–87 from the reactors are connected to a header 88 which connects to a suction line trap or accumulator 90 from which gaseous refrigerant is drawn through line 91. Line 91 may be connected to line 92 to the compressor suction line 93 or alternately to the line 94 connected to header 95 to the condenser 96, manually controlled valves 97 and 98 being provided in the lines 92 and 94, respectively, for controlling the flow.

The liquid refrigerant header 75 is connected by heat exchange coil 98 to line 99 for receiving refrigerant from the receiver 100 through supply line 101. The receiver is connected by line 102 to the condenser 96 which receives compressed refrigerant through discharge line 103 from compressor 105.

Liquid supply header 75 may also be connected to line 110 for receiving refrigerant from liquid pump 111 which is illustrated in Fig. 2 as connected below the receiver 100 by line 112 in order to maintain a liquid head. The valve 113 permits refrigerant to flow from the pump through line 114 back into the condenser 96 when the pressure exceeds a predetermined value.

In the operation of the reaction lines described, assuming operation of line 71–74 at temperature below the condenser temperature, refrigerant from the receiver flows out through line 101 into line 99, valve 115 in line 99 being open, through the trap 90 and into supply line 75 for distribution to the reactors 71–74. From the reactors 71–74 refrigerant is withdrawn through the lines 84–87, flow being controlled by the automatic control valves 116–119 which may be operated as indicated in Fig. 1, into the header 88, the suction line trap 90, and lines 91 and 92 to the suction line 93, valve 98 being closed and valve 97 being open.

In the event that the reaction line 71′–74′ is operated at a temperature above the condensing temperature, the supply header 75′ receives refrigerant from line 110 from the pump 111, the manual valve 120′ being open, and valve 115 being closed. From the reactors the refrigerant returning in header 88′ passes through the trap 90′ and lines 94′ and 95′ to the condenser 96, valve 98′ being open and valve 97′ being closed.

Accordingly, it wil be understood that a simple system has been provided which may be utilized with one or more reactors operating over a wide range of temperatures any of which may operate either above or below that of the condenser, the system being adapted for either the batch type or the continuous flow line process and being easily changed over for operation at different temperatures. Control means are provided for maintaining the temperatures at desired levels.

It will be obvious to those skilled in the art that various changes may be made in the invention without departing from the spirit and scope thereof and therefore the invention is not limited by that which is illustrated in the drawings and described in the specification, but only as indicated in the appended claims.

What is claimed is:

1. A refrigeration system comprising a compressor, a condenser, and a pair of evaporators, said evaporators being operable at temperatures which vary from below the condensing temperature of the condenser to above the condensing temperature, refrigerant supply means for connecting said evaporators selectively to said condenser through a first connection or through a second connection, means in said second connection for increasing the pressure of the refrigerant supplied and refrigerant return means for connecting said evaporators selectively to said compressor or to said condenser.

2. The system of claim 1, the pressure increasing means comprising a pump, a reservoir in said second connection disposed above said pump for providing liquid refrigerant under pressure thereto, said reservoir being disposed intermediate said pump and said condenser.

3. The system of claim 1, first flow control means in said refrigerant supply means, second flow control means in said refrigerant return means, and means responsive to a temperature-pressure condition of said evaporators controlling the operation of said first and second flow control means.

4. A refrigeration system comprising a compressor, a condenser and a pair of evaporators, the first evaporator operating at a temperature below the condenser temperature and the second evaporator operating at a temperature above the condenser temperature, said condenser supplying liquid refrigerant to a reservoir, first means connecting the reservoir to the first evaporator, suction means connecting said first evaporator to the compressor, second means connecting said reservoir to said second evaporator, pump means in said second connecting means, and return means connecting said second evaporator to said condenser.

5. A refrigeration system comprising a compressor, a condenser, a refrigerant reservoir, and an evaporator, a liquid pump connected to the reservoir for receiving refrigerant therefrom, means for supplying refrigerant to the evaporator either directly from the reservoir or from the pump, and means for returning refrigerant fom the evapoator either to the compressor or to the condenser.

6. The system of claim 5, and means connecting the discharge of said liquid pump to said condenser, said connecting means normally being closed and permitting flow in response to a predetermined pressure in said pump discharge line.

7. A refrigeration system comprising a compressor, a condenser, and a plurality of evaporators, first means for connecting the condenser to the evaporators, alternate means for connecting the condenser to the evaporators, pump means in said alternate means, first means for returning the refrigerant from the evaporators to the compressor, and alternate means for returning the refrigerant from the evaporators to the condenser.

8. In a refrigeration system, a pair of evaporator means, compressor means, condenser means connected to the compressor means, first means connected to the condenser means for supplying refrigerant to the evaporator means, second means connected to the condenser means for supplying refrigerant to the evaporator means, means for increasing the pressure in said second means, return means connected to the evaporator means, and means for alternately connecting said return means to the compressor means or to the condenser means.

9. A system as in claim 8, a trap in said return means, said first means connected to the condenser means being arranged in heat transfer relation with said trap.

10. A pair of continuous flow reaction lines, each reaction line comprising a plurality of reactors, each reactor having an evaporator in heat exchange relation therewith, compressor means, and condenser means connected to the compressor means, first and second means for connecting the condenser means to the evaporators in either or both of the lines, valve means for rendering inoperative either or both of the first and second connecting means, third and fourth means for connecting the condenser means to the evaporators in either or both of the lines, pump means in said third and fourth connecting means, valve means for rendering inoperative either or both of said third and fourth connecting means, first and second return means connecting the evaporators in said lines to said compressor means, valve means in said first and second return connecting means for rendering either or both inoperative, third and fourth return means connecting the evaporators in said lines to said condenser means, and valve means in said third and fourth return connecting means for rendering either or both inoperative.

11. For use with a pair of reactors, each reactor having an evaporator in heat exchange relation therewith, compressor means, and condenser means connected to the compressor means, first and second means for connecting the condenser means to the evaporators in parallel, valve means for rendering inoperative either or both of the first and second connecting means, third and fourth means for connecting the condenser means to the evaporators in parallel, pump means in said third and fourth connecting means, valve means for rendering inoperative either or both of said third and fourth connecting means, first and second return means connecting the evaporators to said compressor means, valve means in said first and second return connecting means for rendering either or both inoperative, third and fourth return means connecting the evaporators to said condenser means, and valve means in said third and fourth return connecting means for rendering either or both inoperative.

12. In a refrigeration system, a condenser, a receiver, an evaporator, a liquid pump connected to the receiver for receiving refrigerant therefrom and having its discharge connected to the evaporator for supplying refrigerant thereto, means connecting the evaporator discharge to the condenser, first valve means in the line between the pump and the evaporator, said valve means being operative to control the flow to the evaporator, and means operative to prevent the pressure in said line from exceeding a pre-determined maximum, said last mentioned means comprising auxiliary means connecting the pump discharge to the condenser.

13. The system of claim 12, and control valve means responsive to the pressure in the line between the pump and said first valve means, said control valve means controlling the flow through said auxiliary means.

References Cited in the file of this patent

UNITED STATES PATENTS

| | | |
|---|---|---|
| 1,909,823 | Forrest et al. | May 16, 1933 |
| 2,244,312 | Newton | June 3, 1941 |
| 2,518,299 | Fernandez | Aug. 8, 1950 |
| 2,523,451 | Schulz et al. | Sept. 26, 1950 |
| 2,530,440 | Nussbaum | Nov. 21, 1950 |
| 2,546,723 | Clark | Mar. 27, 1951 |
| 2,589,859 | Phillips | Mar. 18, 1952 |
| 2,655,794 | Ruff | Oct. 20, 1953 |
| 2,764,880 | Wenzelberger | Oct. 2, 1956 |

FOREIGN PATENTS

| | | |
|---|---|---|
| 356,336 | Great Britain | Sept. 10, 1931 |